United States Patent [19]

Ciaccia

[11] Patent Number: 4,891,272

[45] Date of Patent: Jan. 2, 1990

[54] WATERPROOFING MEMBRANES BASED ON BITUMEN

[75] Inventor: Vittorio Ciaccia, Ferrara, Italy

[73] Assignee: Ausimont S.r.l., Milan, Italy

[21] Appl. No.: 333,231

[22] Filed: Apr. 5, 1989

[30] Foreign Application Priority Data

Apr. 7, 1988 [IT] Italy ............................... 20112 A/88

[51] Int. Cl.$^4$ ........................ B32B 11/00; B32B 27/08
[52] U.S. Cl. .................................... 428/489; 428/515; 428/516; 428/517
[58] Field of Search ................ 428/489, 515, 516, 517

[56] References Cited

U.S. PATENT DOCUMENTS

| | | | |
|---|---|---|---|
| 4,511,619 | 4/1985 | Kuhnel et al. | 428/517 |
| 4,719,153 | 1/1988 | Akasawa et al. | 428/517 |
| 4,740,413 | 4/1988 | Wildner | 428/517 |
| 4,788,099 | 11/1988 | Fukushima et al. | 428/517 |

Primary Examiner—Morton Foelak
Attorney, Agent, or Firm—Stevens, Davis, Miller & Mosher

[57] ABSTRACT

Waterproofing sheets or membranes comprising a support constituted by or comprising a vulcanized polyolefinic rubber enclosed in a structure of sandwich type between two layers of bituminous composition selected from:

(1) compositions comprising, by weight
  (A) 60–90% of bitumen
  (B) 3.5–20% of EPM or EPDM rubber
  (C) 3–20% of HD polyethylene
  (D) 1.5–10% EVA copolymer
  (E) 0–10% of isotactic polypropylene
  (F) 0–20% of inorganic filler
(2) compositions comprising, by weight
  (A) 60–90% of bitumen
  (B) 40–10% of styrene-butadiene elastomeric copolymer
  (C) 0–20% of amorphous polypropylene
  (D) 0–20% of inorganic filler.

3 Claims, No Drawings

WATERPROOFING MEMBRANES BASED ON BITUMEN

BACKGROUND OF THE INVENTION

It is known that waterproofing sheets suitable, e.g., for accomplishing roofings for buildings and industrial coverings, as well as coverings for water basins and landfills, are obtained by means of the impregnation of felts, or of fabrics, or of non-woven fabrics made from fibres of either natural or synthetic materials, with bitumen in the molten state.

This latter can be constituted by bitumen of distilled type, modified by means of the addition of certain amounts of amorphous plastomeric olefinic hompolymers and copolymers, such as polypropylene, or of elastomeric, thermoplastic ethylene/propylene copolymers, or styrene/butadiene/styrene copolymers.

The addition of such materials makes it possible bitumens to be obtained, which are endowed with high mechanical and elastic properties. However, with the supports used heretofore (generally of fiberglass or of fibres of polyester resins), which typically have extremely low elastic properties, the elastic characteristics of the bituminous component remain unused, so that end structures are obtained, the characteristics of which are practically anelastic. Furthermore, the supports of the above said type show a poor resistance to ageing and do not display any barrier properties for water, once that the layer of bitumen loses its continuity owing to stresses, yieldings of the structures and of the waterproofing materials, or owing to an incorrect application.

THE PRESENT INVENTION

The Applicant discovered now a new type of waterproofingsheets or membranes on the basis of bitumen, which overcomes the above described drawbacks, and moreover is easy to prepare and apply.

Such sheets or membranes, which are the object of the present invention, are constituted by, or comprise, a sheet of a vulcanized elastomer copolymer or terpolymer, respectively of the ethylene/propylene or ethylene/propylene/diene (EP or EPDM rubber) type enclosed to form a structure of sandwich type between two layers, or surfaces, of an elastomer containing asphalt or bitumen composition selected from:

(1) compositions comprising, by weight:
(A) from 60 to 90% of bitumen,
(B) from 3.5 to 20% of an elastomeric ethylene/propylene copolymer or ethylene/propylene/diene terpolymer containing from 30 to 45% by weight of combined propylene and from 0 to 10% by weight of a combined diene monomer, having a Mooney |ML (1+4) at 100° C.| viscosity higher than 5 but preferably comprised within the range of from 8 to 50, and most preferably between 40 and 45;
(C) from 3 to 12% of polyethylene having a density between 0.96 and 0.98 g/cm$^3$ a M.I. greater than 5, but preferably comprised between 10 and 30, and optionally containing up to 10% by weight of copolymerized propylene units;
(D) from 1.5 to 10% by weight of an ethylene/vinyl acetate copolymer containing from 60 to 95% by weight of ethylene, and having an M.I. higher than 0.1 but preferably comprised between 0.5 and 200
(E) from 0 to 10% of isotactic polypropylene having M.I. greater than 1, and preferably comprised between 5 and 15
(F) from 0 to 20% of inorganic filler.
(2) compositions comprising, by weight:
(A) from 60% at 90% of bitumen,
(B) from 40 to 10% of a styrene-butadiene elastomeric copolymer
(C) from 0 to 20% of amorphous polypropylene
(D) from 0 to 20% of inorganic filler.

Examples of inorganic fillers suited for compositions (1) and (2) illustrated above, are Kaolin, calcium carbonate, silica.

The thickness of the rubber in the waterproofing membranes according to the present invention is not critical, in that it depends on the type of employment to which the membranes are destined. For the generality of the employments, said thickness is comprised within the range of from 0.5 to 1.0 mm.

The composition of the elastomeric copolymers and terpolymers which constitute the sheet enclosed between the two layers of bitumen, according to the present invention, is not critical.

In general, such copolymers comprise from 25 to 50% by weight of propylene units, and from 0 to 10% by weight of units deriving form copolymerized dienic monomers.

Such dienic monomers can be represented, for exemplifying purposes, by ethylidene-norbornene, dicyclopentadiene, 1,4-hexadiene, cyclohexadiene, butadiene.

Such copolymers and terpolymers, as well as the elastomer EPM copolymers and EPDM terpolymers contained in the bituminos composition (1) can be prepared according to known methods. Among such copolymers and terpolymers, those have shown to be particularly suitable, which are obtained by means of high-yield catalysts based on titanium compounds, such as disclosed, e.g., in U.S. Pat. No. 4,013,823.

The dienic monomers contained as combined monomeric units in the elastomeric terpolymers of polymeric composition (1) can be, e.g., those as above disclosed for the terpolymers which constitute the rubber sheet.

The butadiene-styrene elastomeric copolymers which are present in the asphalt composition (2) comprise from 10 to 35% styrene and can be of the styrene-butadiene type or of the styrene-butadiene-styrene type, and can be either of the linear or of the star-type. Such copolymers are well known in the art. Methods for their manufacture are disclosed for instance in U.S. Pat. Nos. 3,281,383 - 3,637,554 - 3,639,517 - 4,086,298 - 4,180,530 - 4,221,884 in French Pat. No. 2,093,581 and in the British specification No. 1,130,770.

The surface of the rubber sheet can be smooth or, preferably, it can be rough or embossed with a cloth-like pattern, in order to favour the adhesion to the bitumen layers.

The preparation of the membranes can be carried out by means of any methods as used for surface coatings; it can be accomplished, e.g., by dipping the vulcanized rubber sheet into the liquid bitumunous composition, then causing the sheet to pass through two thickness-control rolls and then cooling it. According to an alternative procedure, said membranes can be prepared by calendering, with the liquid bituminous composition being fed between two rolls of a calender, with the vulcanised rubber sheet being interposed between two layers of said bituminous composition.

The following examples are supplied in order to illustrate the invention, without being limitative thereof.

EXAMPLE 1

By using an EPDM elastomer constituted, by weight, by 45% of propylene, 53% of ethylene and 2% of ethylidenenorbornene, having a Mooney |ML (1+4) at 100° C.| viscosity of 40, and using a conventional vulcanization formulation based on sulfur and accelerators, a vulcanized sheet having an embossed surfaces is prepared, which has thickness of 0.6 mm and has the following characteristics:

| Tensile strength | MPa | 9 | (ASTM D412) |
|---|---|---|---|
| Elongation at break | % | 300 | (ASTM D412) |
| Modulus 200% | MPa | 6.8 | (ASTM D412) |
| Tension set 200% | % | 9 | (ASTM D412) |
| Shore A hardness | Points | 55 | |
| Tearing strength | N/mm | 40 | (ASTM D624/C) |
| Brittleness temperature | °C. | −45 | (ASTM D2137) |
| Ozone resistance | | no breakages | (ASTM D1149) |

Such a sheet is dipped into a tank containing a liquid bituminous composition, maintained at 180° C., constituted by a mixture of:

| Distilled bitumen of 180/200 type | parts by weight | 75 |
|---|---|---|
| Ethylene/propylene/ethylidenenorbornene terpolymer (45% of $C_3$; 52% of $C_2$) having a mooney viscosity of 48 | parts by weight | 7.5 |
| Ethylene/vinyl acetate copolymer, containing 18% of vinyl acetate and having an M.I. = 2 | parts by weight | 3.0 |
| High density polyethylene (d = 0,965 g/cm$^3$), having M.I. = 28 | parts by weight | 4.5 |
| Mineral filler powder (calcium carbonate) | parts by weight | 10 |

Such a mixture has a Brookfield viscosity at 180° C. of 10,000 cps, and shows the following further characteristics:

| Ring-Ball | °C. | 125 | (UNI 8202) |
|---|---|---|---|
| Penetration at 25° C. | 1/mm | 30 | (UNI 8202) |
| Penetration at 60° C. | 1/mm | 130 | (UNI 8202) |
| Flexibility | °C. | −10 | (UNI 8202) |
| Tensile strength | kg/cm$^2$ | 5 | (UNI 8202) |
| Elongation at break | % | 200 | (UNI 8202) |

A bituminous membrane is thus obtained which, after being passed through thickness-control rolls and subsequent cooling shows the following characteristics:

| Thickness | 4,0 mm | | (UNI 8202) |
|---|---|---|---|
| Flexibility at −5° C. | no breakages | | (UNI 8202) |
| Longitudinal tensile strength | kg/5 cm | 87 | (UNI 8202) |
| Transversal tensile strength | kg/5 cm | 80 | (UNI 8202) |
| Longitudinal elongation at break | % | 200 | (UNI 8202) |
| Transversal elongation at break | % | 180 | (UNI 8202) |
| Impermeability to water | absolute | | (UNI 8202) |

EXAMPLE 2

The preparation of Example 1 is repeated with the difference that the liquid bituminous mass is applied by causing it to run at 160° C. through the cold rolls of a calendar, with the vulcanized rubber sheet being interposed between two layers of said liquid bituminous mass.

The properties of the so obtained membrane are analogous to those of the membrane of Example 1.

EXAMPLE 3

The preparation of Example 1 is repeated using a sheet of EPM rubber (68% by weight of ethylene) having a Mooney |ML (1+4) at 100° C.| viscosity of 50.

Such sheet was press-vulcanized using a conventional vulcanization formulation on the basis of sulfur, peroxides and co-agents, and after the vulcanization showed the following characteristics:

| Thickness | mm | 0.7 | |
|---|---|---|---|
| Tensile strength | MPa | 10.0 | (ASTM D412) |
| Elongation at break | % | 250 | (ASTM D412) |
| Modulus 200% | MPa | 7.0 | (ASTM D412) |
| Tension set 200% | % | 7 | (ASTM D412) |
| Shore A hardness | Points | 55 | |
| Tearing strength | N/mm | 50 | (ASTM D624/C) |
| Brittleness temperature | °C. | −45 | (ASTM D2137) |
| Ozone ressitance | no breakages | | (ASTM D1149) |

The bituminous composition used is that of Example 1.

The characteristics of the so-obtained membrane are the following:

| Flexibility at −5° C. | no breakages | | (UNI 8202) |
|---|---|---|---|
| Longitudinal tensile strength | kg/5 cm | 80 | (UNI 8202) |
| Transversal tensile strength | kg/5 cm | 75 | (UNI 8202) |
| Longitudinal elongation at break | % | 170 | (UNI 8202) |
| Transversal elongation at break | % | 170 | (UNI 8202) |
| Impermeability to water | absolute | | (UNI 8202) |

EXAMPLE 4

The cured rubber sheet described in Example 1 is dipped in an asphalt composition at 180° C. consisting by weight of:

| bitumen 180/200 | (parts by weight) | 78 |
|---|---|---|
| stirene/butadiene/stirene star copolymer containing 30% b.w. styrene, having | | = 1.6 dl/g | | 12 |
| calcium carbonate powder | | 10 |

The asphalt composition has a Brookfield viscosity at 180° C. = 9,000 cps and shows the following characteristics:

| Ring and ball | °C. | 110 |
|---|---|---|
| Penetraion at 25° C. | 1/mm | 60 |
| Penetration at 60° C. | 1/mm | 180 |
| Flexibility | °C. | −20 |
| Breaking load | kg/cm$^2$ | 7 |
| Elongation at break | % | greater than 1,000 |

A bituminous membrane is thus obtained that after passage through thickness-control rolls and subsequent cooling shows characteristics similar to that of Example 1.

What is claimed is:

1. Waterproofing sheets or membranes formed by, or comprising a sheet of a vulcanized elastomeric ethylene/propylene copolymer or ethylene/propylene/diene terpolymer enclosed to form a structure of sandwich type between two layers, or surfaces, of a bituminous composition selected from:
   (1) compositions comprising by weight:
   (A) from 60 to 90% of bitumen
   (B) from 3.5 to 20% of elastomeric ethylene/propylene copolymer or ethylene/propylene/diene terpolymer containing from 30 to 45% by weight of combined propylene and from 0 to 10% by weight of a combined diene monomer, and having a Mooney |ML (1+4) at 100° C.| viscosity higher than 5
   (C) from 3 to 12% of polyethylene having a density comprised between 0.96 and 0.98 g/cm³, a M.I. greater than 5, and optionally containing up to 10% by weight of copolymerized propylene units
   (D) from 1.5 to 10% of ethylene-vinylacetate copolymer containing from 60 to 95% by weight of ethylene, and having a M.I. higher than 0.1
   (E) from 0 to 10% of isotactic polypropylene having M.I. greater than 1
   (F) from 0 to 20% of inorganic filler
   (2) compositions comprising by weight:
   (A) from 60 to 90% of bitumen
   (B) from 40 to 10% of a styrene/butadiene elastomeric copolymer
   (C) from 0 to 20% of amorphous polypropylene
   (D) from 0 to 20% of inorganic filler 2. Waterproofing sheets or membranes according to claim 1, wherein component (B) of composition (1) has been obtained by polymerization of the monomers in the presence of high-yield catalysts based on titanium compounds.

3. Waterproofing sheets or membranes according to claim 2 wherein said component (B) has a Mooney viscosity

|ML (1+4) at 100° C.| comprised between 40 and 45.

* * * * *